Dec. 25, 1951     D. M. SEELEY     2,580,249
TRANSPORTATION LOAD AND METHOD OF PREPARING SAME
Filed April 19, 1949     7 Sheets-Sheet 1
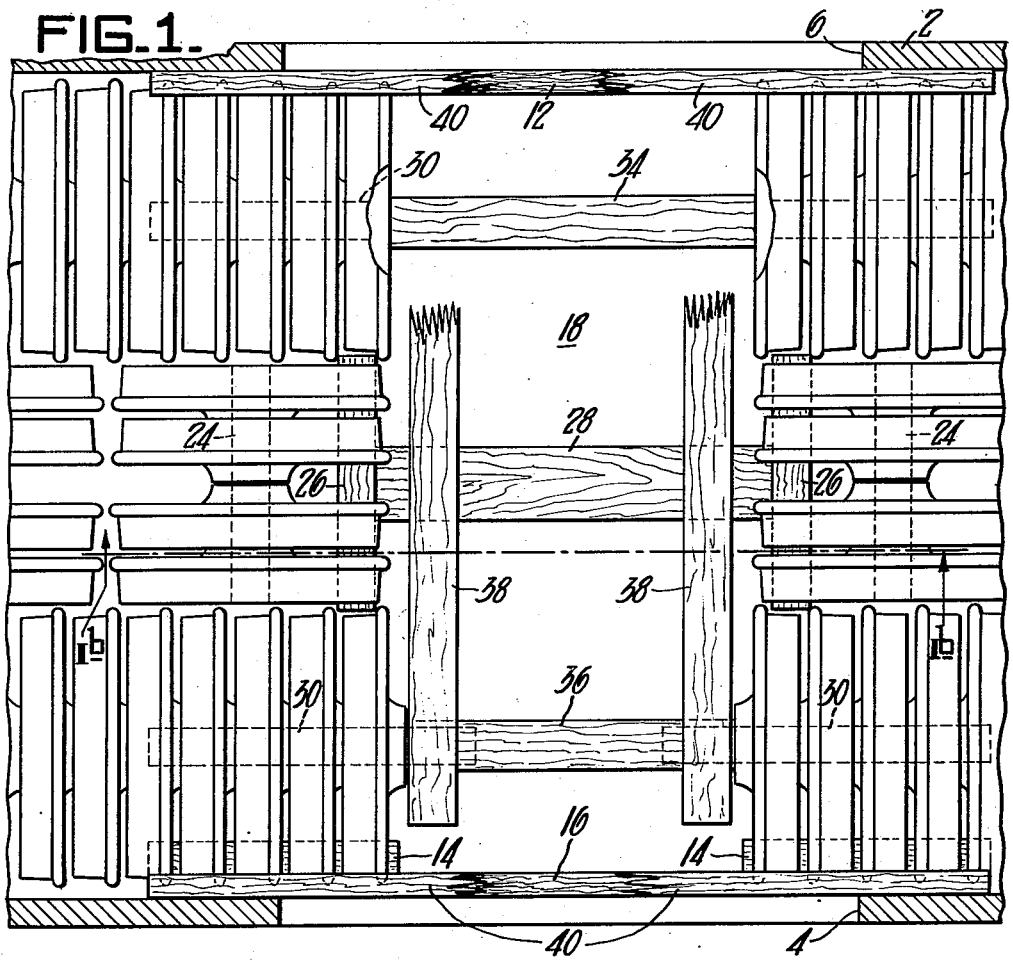
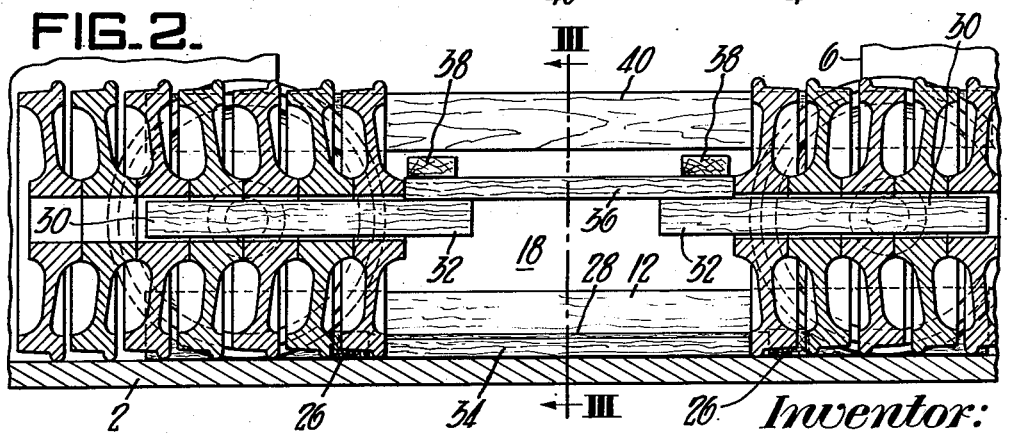
Inventor:
DEWEY M. SEELEY,
by: Donald G. Dalton
his Attorney.

Dec. 25, 1951     D. M. SEELEY     2,580,249
TRANSPORTATION LOAD AND METHOD OF PREPARING SAME
Filed April 19, 1949     7 Sheets-Sheet 2
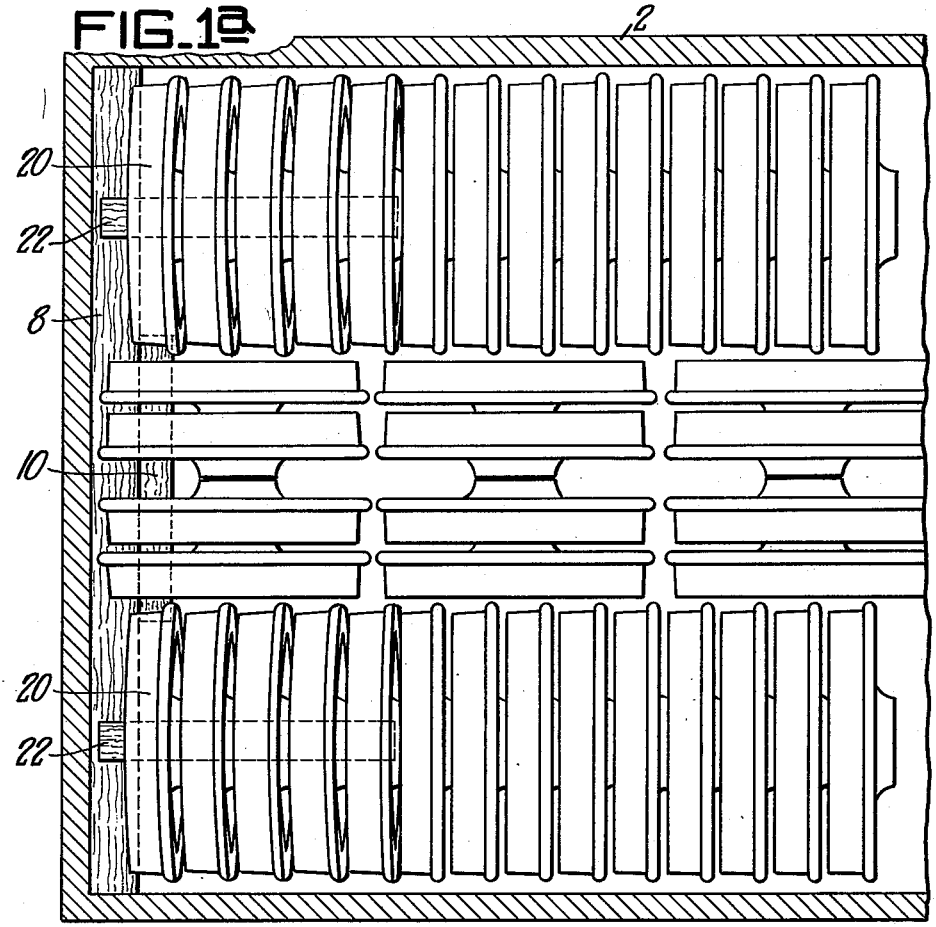
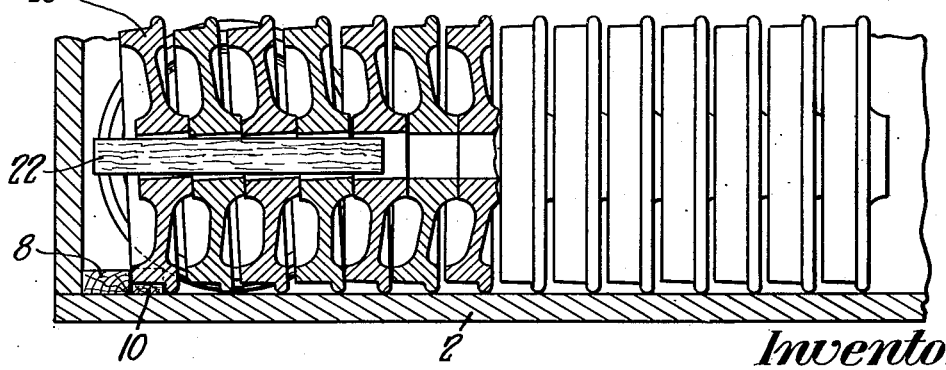
Inventor:
DEWEY M. SEELEY,
by Donald G. Dalton
his Attorney.

Dec. 25, 1951 D. M. SEELEY 2,580,249
TRANSPORTATION LOAD AND METHOD OF PREPARING SAME
Filed April 19, 1949 7 Sheets-Sheet 3

Inventor:
DEWEY M. SEELEY,
by Donald G. Dalton
his Attorney.

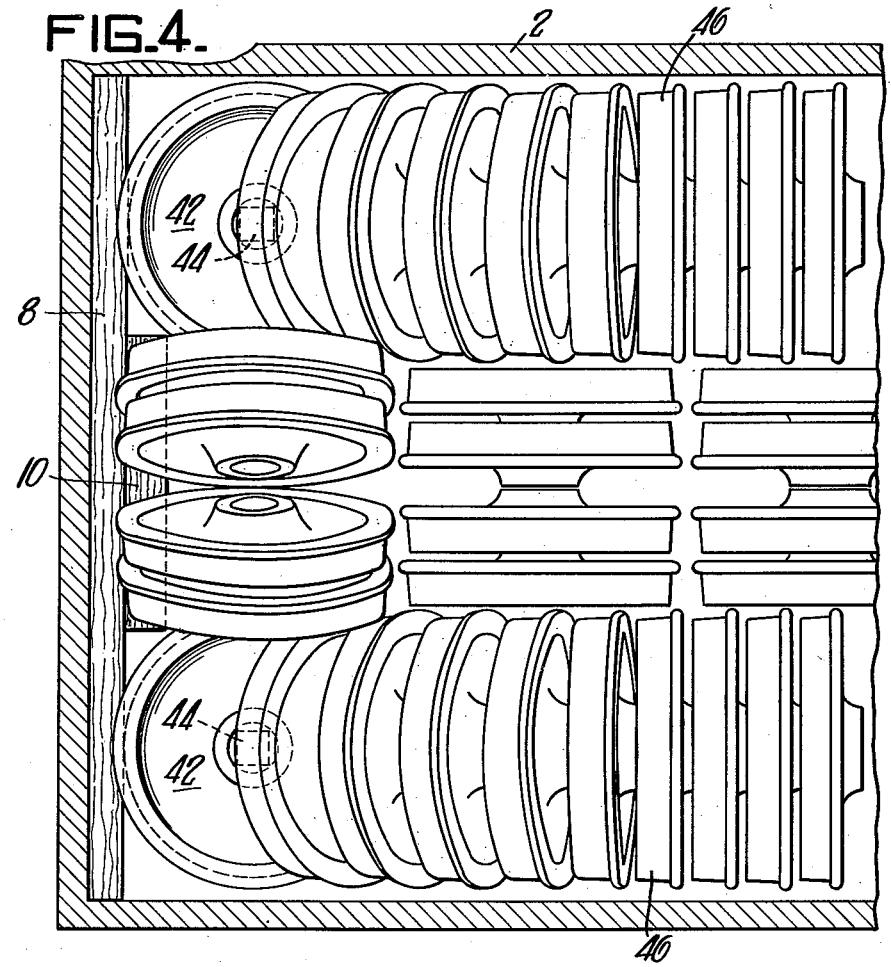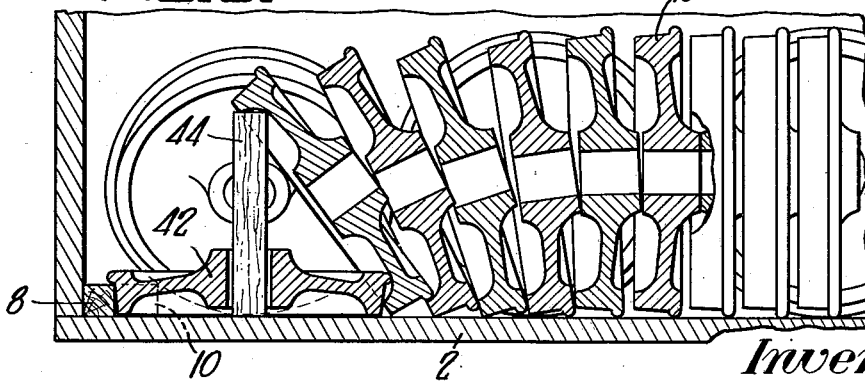

Dec. 25, 1951 D. M. SEELEY 2,580,249
TRANSPORTATION LOAD AND METHOD OF PREPARING SAME
Filed April 19, 1949 7 Sheets-Sheet 5

Inventor:
DEWEY M. SEELEY,
by: Donald G. Dalton
his Attorney

Dec. 25, 1951     D. M. SEELEY     2,580,249
TRANSPORTATION LOAD AND METHOD OF PREPARING SAME
Filed April 19, 1949     7 Sheets-Sheet 6
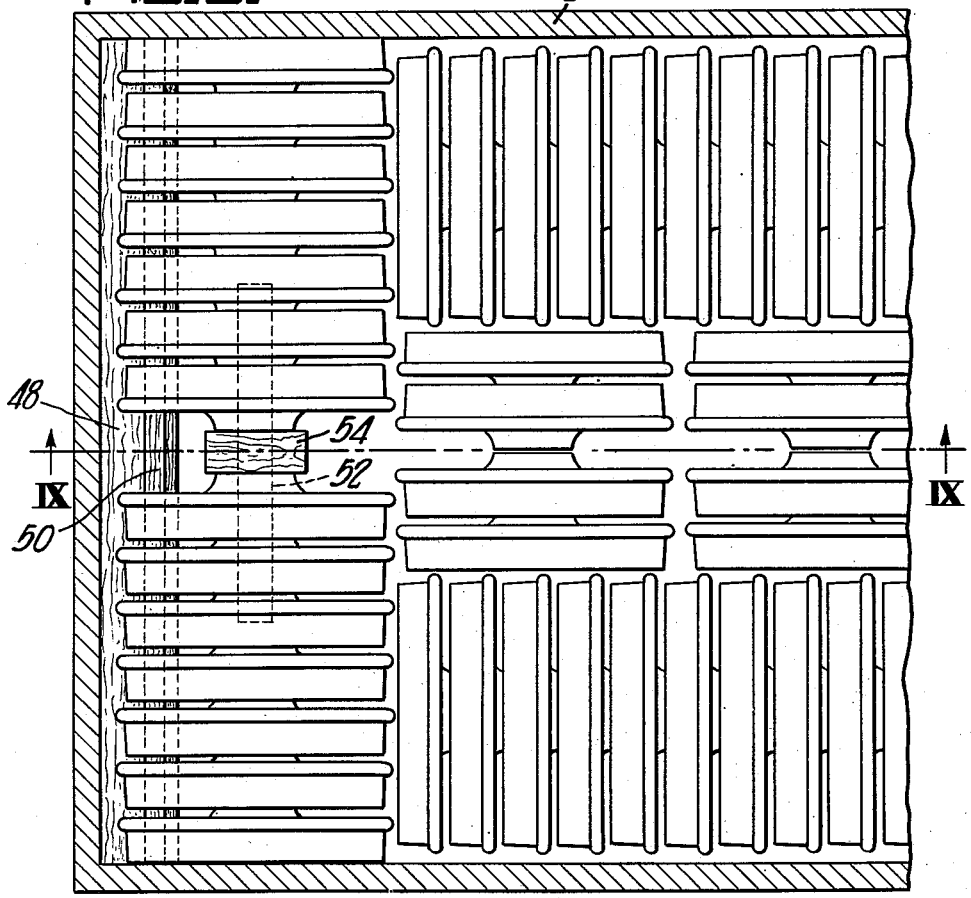
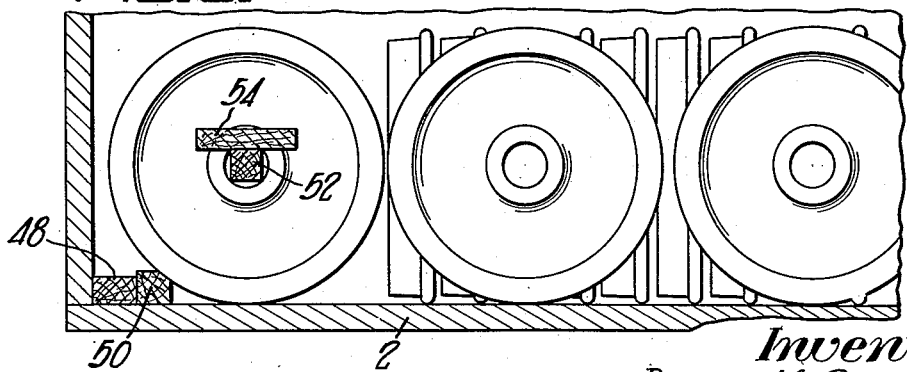
Inventor:
DEWEY M. SEELEY,
by: Donald G. Dalton
his Attorney.

Dec. 25, 1951     D. M. SEELEY     2,580,249
TRANSPORTATION LOAD AND METHOD OF PREPARING SAME
Filed April 19, 1949     7 Sheets-Sheet 7
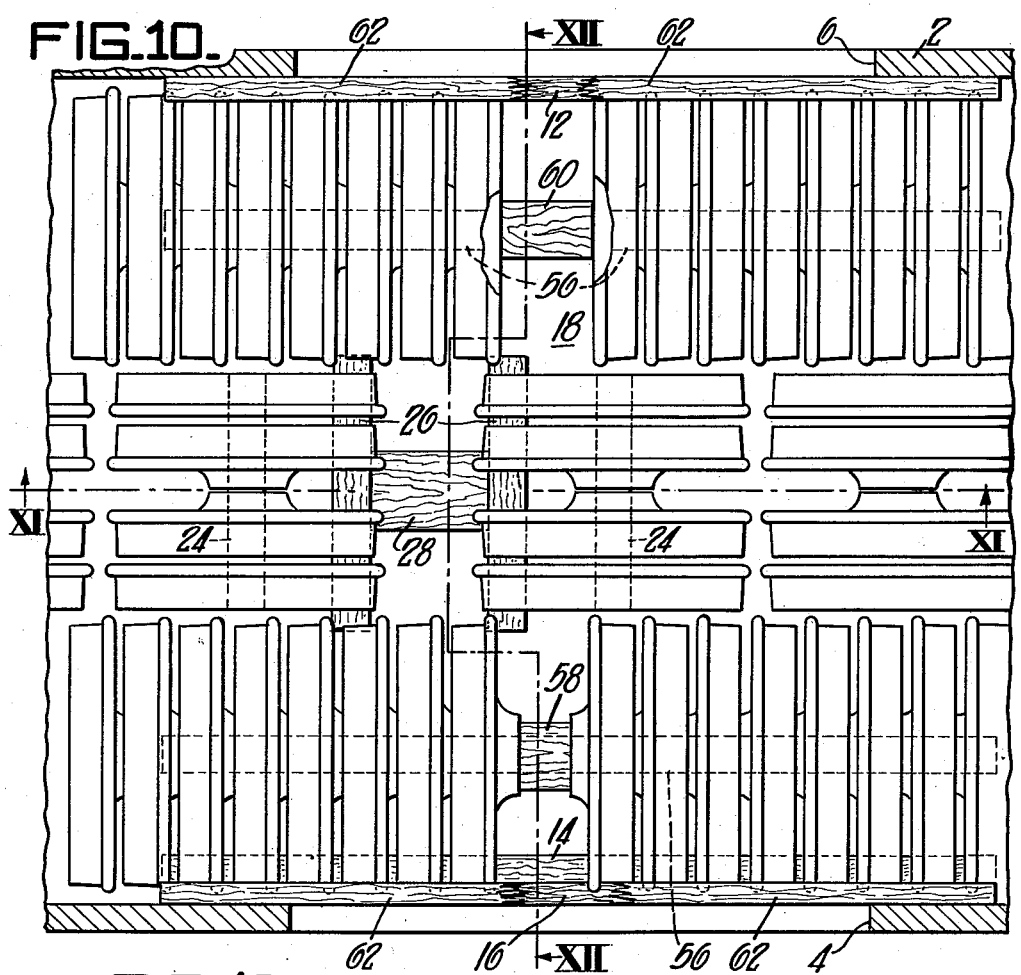
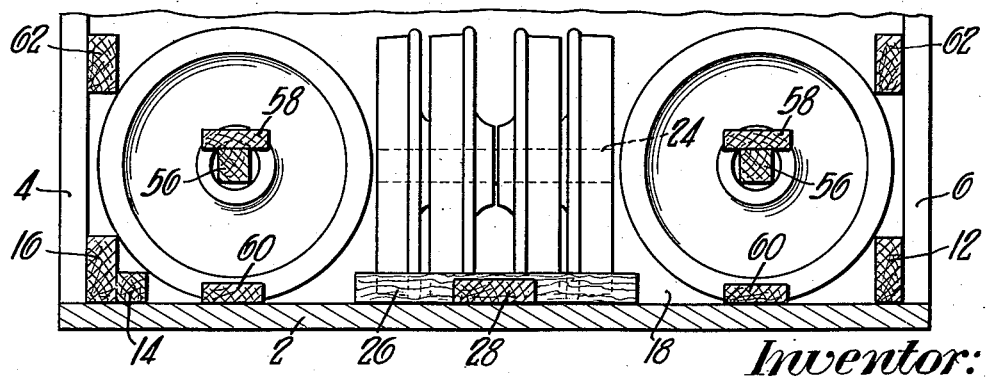
Inventor:
DEWEY M. SEELEY,
by: Donald G. Dalton
his Attorney.

Patented Dec. 25, 1951

2,580,249

UNITED STATES PATENT OFFICE 2,580,249

TRANSPORTATION LOAD AND METHOD OF PREPARING SAME

Dewey M. Seeley, Gary, Ind., assignor to United States Steel Company, a corporation of New Jersey Application April 19, 1949, Serial No. 88,262

26 Claims. (Cl. 105—367)

1

This invention relates to transportation load and method of preparing the same and is especially adapted for the transportation of railroad car wheels in a car having its width greater or less than an aliquot multiple of the wheel diameter.

The loading, shipping and unloading of railroad car wheels has always been a problem due to the irregular shape, size and weight of the wheels. The wheels, being round with a flange off-center, will not stand upright when unsupported. The protruding hubs of the wheels further complicate the problem of arranging the wheels in a load which can be solidly blocked. The blocking of the wheels in a railroad car has been particularly troublesome since, however stacked according to any of the approved loading methods in use prior to my invention, there was always a certain amount of play in the load which permitted pounding. The impact of continuous pounding eventually tore out any spikes on which the load was concentrated and thereby caused the blocking to be torn loose. When the blocking was torn loose, the wheels were free to roll or slide around and cause considerable damage to both the load of wheels and the car.

The previously used loading methods were also inherently inefficient inasmuch as less than two-thirds of a railway box car's total weight capacity could be utilized when the car was loaded in accordance with any of the load patterns approved and in use prior to my invention.

It is, accordingly, an object of this invention to provide a transportation load of railroad car wheels and a method of preparing the same in a railroad shipping car so that neither the wheel load or the shipping car is damaged in transit.

Another object of my invention is to provide a transportation load of railroad car wheels and a method of preparing the same which will efficiently utilize the weight capacity of a shipping car.

These and other objects will become more apparent after referring to the following specification and attached drawings, in which:

Figure 1 is a plan view showing the center blocking of my invention;

Figure 1a is a plan view showing a car end wheel piling arrangement;

Figure 2 is a side elevation of Figure 1;

Figure 2a is a side elevation of Figure 1a;

2

Figure 11:
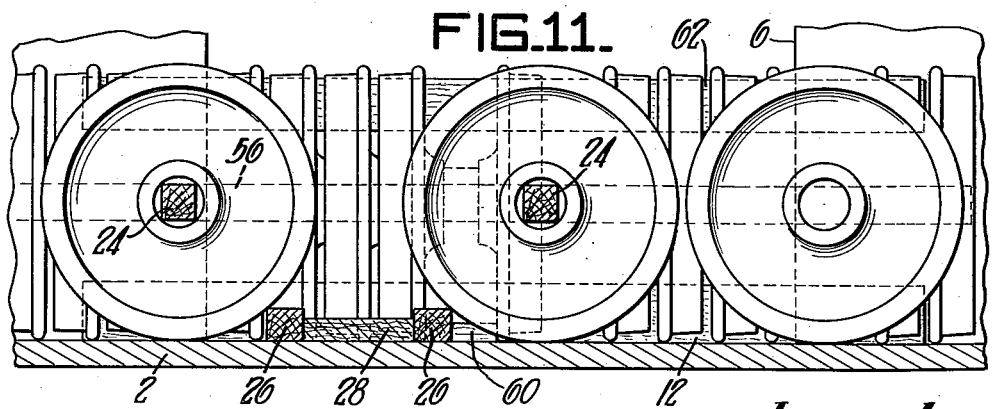
Figure 6:
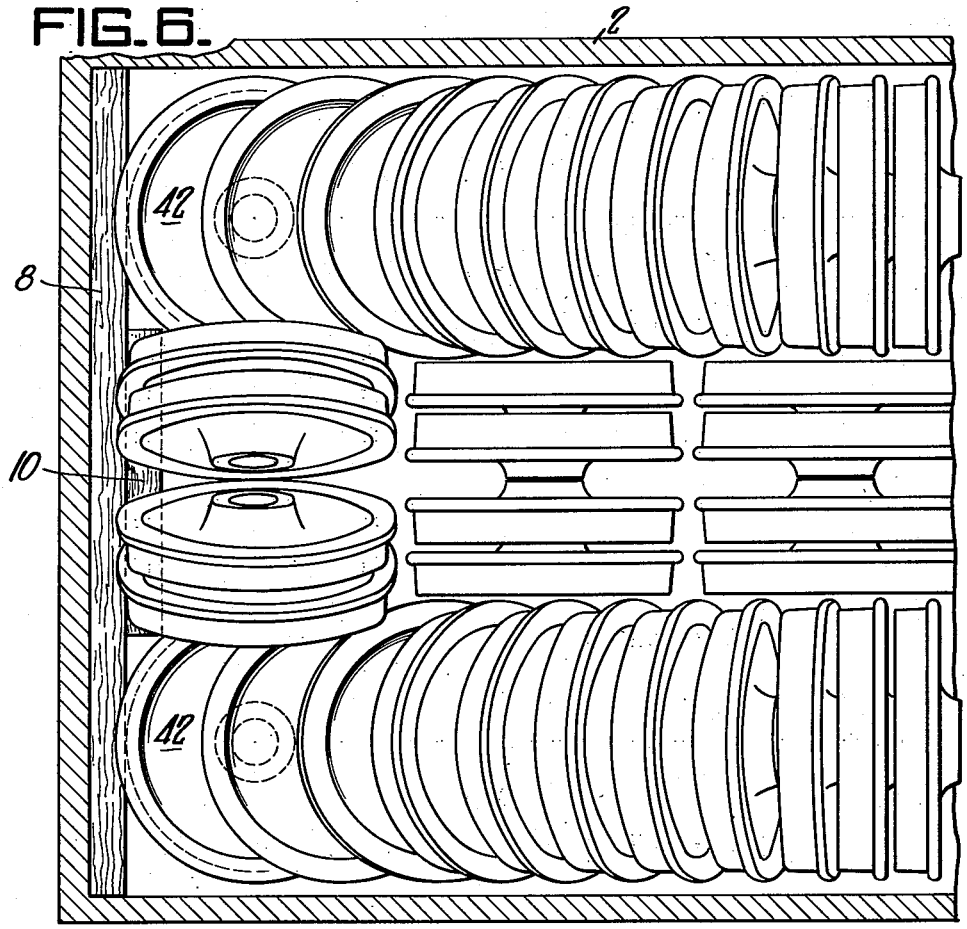
Figure 7:
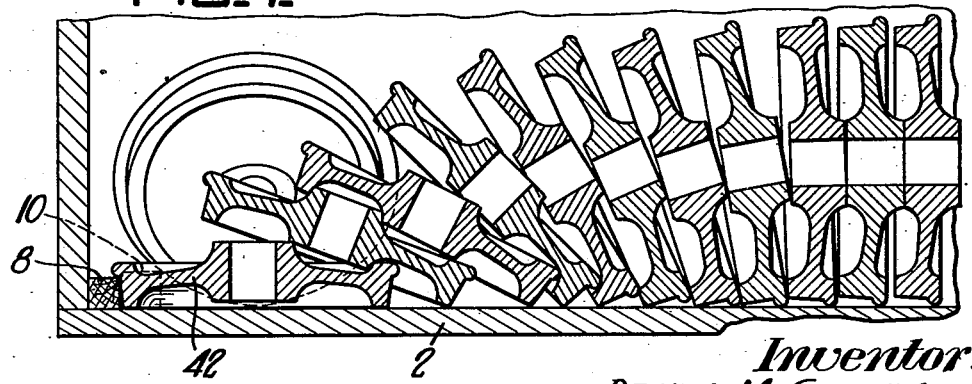

Figure 4 is a plan view showing a modification of the car end wheel piling arrangement;

Figure 5 is a side elevation of Figure 4;

Figure 6 is a plan view showing a modification of Figure 4;

Figure 7 is a side elevation of Figure 6;

Figure 8 is a plan view showing another modification of the car end wheel piling arrangement;

Figure 9 is a longitudinal sectional view taken on the line IX—IX of Figure 8;

Figure 10 is a plan view showing the center car blocking of a car fully loaded according to the invention;

Figure 11 is a longitudinal sectional view taken on the line XI—XI of Figure 10; and Figure 12 is a cross sectional view taken on the line XII—XII of Figure 10.

Referring more particularly to the drawings, the reference numeral 2 indicates a railway box car loaded with railway car wheels according to my invention. Box car 2 is provided with two oppositely located center doorways 4 and 6, doorway 4 being used as a loading doorway. It will be noted that the invention described hereinafter may also be used in a car having only one doorway or any other type of railway car. In loading the car, cross timbers 8 are spiked, bolted or otherwise fastened to the floor of the car adjacent each end wall. A shorter cross timber 10, having a length approximately one-third of the length of timber 8, is fastened to the floor of the car adjacent the mid-section of each of the timbers 8. A lengthwise timber 12 is positioned across the lower part of the doorway 6 and fastened to the frame thereof. A pair of cleat timbers 14 is fastened to the floor of the car parallel to and spaced slightly from the side walls of the car adjacent doorway 4. A lengthwise timber 16 is set loosely on the floor of the car adjacent the loading doorway 4 between one of the cleats 14 and the side wall of the car so that it can be slid across the doorway and fastened in position after the last wheel is loaded. Timber 16 is of sufficient length so as to span and overlap doorway 4. It is secured in position after loading has been completed by being fastened to the ends of cleat timbers 14.

After the preliminary blocking has been completed, that is, the installation of the cross timbers 8, cross timbers 10, lengthwise timber 12, cleat timbers 14, and the tentative positioning of lengthwise timber 16, the car wheels are loaded in the car in parallel rows on each side of the doorways. Each half of the car on either side of the doorways is loaded in the same manner, the rows on one side of the doorways being aligned with the rows on the other side with an open space 18 between the aligned rows. I have found it preferable to load both ends of the car simultaneously so as to maintain an even distribution of weight in the car.

A plurality of the end wheels adjacent space 18 of each of the aligned side rows are placed in vertical upright position with their flanges facing toward space 18. The car is too narrow to accommodate three rows of wheels positioned in the same manner as the wheels in each of the side rows; therefore, the wheels loaded between the side rows are preferably placed upright in pairs turned at right angles to the wheels in the side rows. As shown, the paired wheels are arranged with their flanged edges facing the median line of the car, but it will be understood that the wheels can face in any direction to suit the width of space 18. The flanges of the rear pairs of wheels in each of the center rows are prevented from bearing against the end walls of the car by the short cross timber 10.

In order to prevent the adjacent end pairs of wheels in each center row from shifting and getting into the open space 18 at the doorways, they are double blocked. A square needle timber 24 is threaded through the bores of the adjacent end wheels of each of the aligned center rows to interlock them. Then a chock timber 26 is fastened to the floor of the car adjacent the end wheels in each center row. A lengthwise timber 28 is fastened to the floor of the car between the timbers 26.

A square needle timber 30 is threaded into the bores of several of the end wheels of each side row adjacent space 18. As the square needle timbers 30 are inserted, an end portion 32 of each is allowed to project outwardly into space 18. The diagonals of the timbers 30 are only slightly smaller than the bores of the wheels. The needle timber 30 holds the wheels together and any tendency for the wheels to fall in either direction would cause them to pinch the needle timber instead of falling flat on the floor of the car.

When the needle timbers have been inserted as described, lengthwise timbers 34 are fastened to the floor of the car in the space 18 between the flanges of the adjacent end wheels of the aligned side rows. Lengthwise timbers 36 are fitted between the hubs of the adjacent end wheels of each side row and then spiked, bolted or otherwise fastened to the projecting ends 32 of the needle timbers 30. Although I have shown lengthwise timbers 34 blocking the lower portions of the adjacent end wheels of each side row, it will be noted that timbers 34 may be omitted, if desired, since timbers 36 will provide sufficient blocking between the adjacent end wheels of the side rows. A pair of spaced apart cross timbers 38 is then laid across and fastened to the two lengthwise timbers 36 to prevent the rotation of timbers 36 and needle timbers 30. Since cross timbers 38 do not function to block the load, it will be obvious that the number thereof is not limited to two but may be one or more as desired.

Figure 1B:
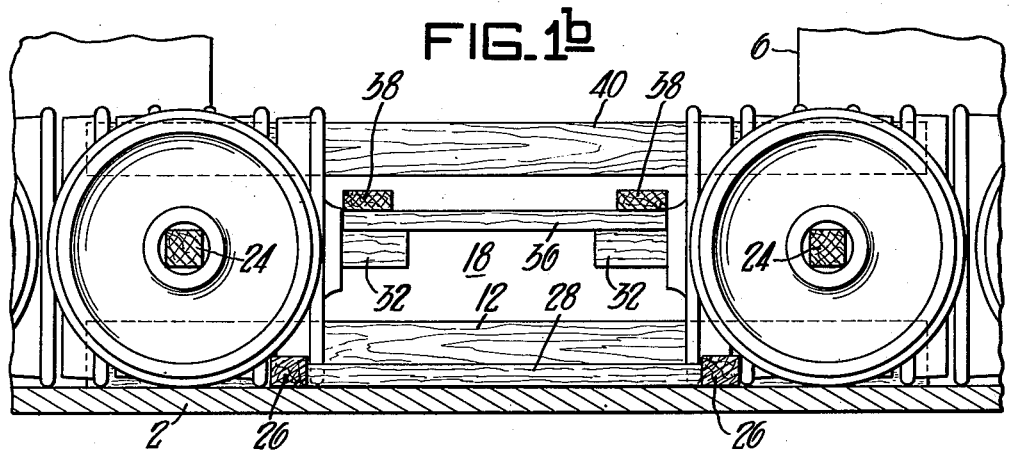
Figure 1b is a longitudinal sectional view taken on the line Ib—Ib of Figure 1.
Figure 3:
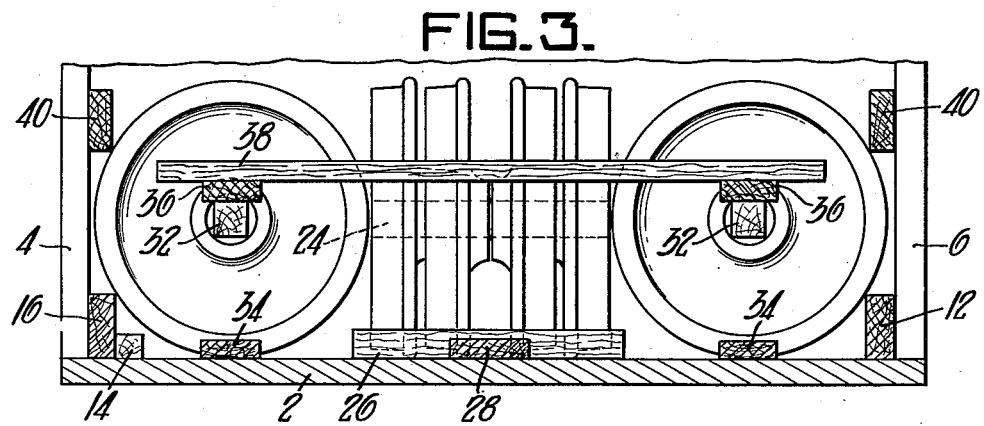
Figure 3 is a cross sectional view taken on the line III—III of Figure 2.

The rear wheels of each of the aligned side rows adjacent the end walls of the car may be arranged in several ways to be hereinafter described. Figures 1a and 2a show one arrangement that may be used.

In this embodiment of my invention, the wheels in each of the side rows are placed in vertical upright position. Rear wheel 20 of each of the side rows is prevented from contacting the end walls of the car by the cross timber 8. As the side rows of wheels are loaded in each end of the car, a square needle timber 22 is inserted through the bores of the rear four or five wheels in each side row. Needle timber 22 is large enough and fits snugly enough in the bores of the wheels to limit the angle of leaning in the wheels. The weight of the wheels leaning on timber 22 will prevent it from working forward in the row of wheels. After all the wheels have been loaded in the car and arranged as described above, the timber 16 is slid across the loading doorway 4 and fastened to the ends of the cleat timbers 14 to block the doorway.

The loading and blocking is finally completed by positioning a lengthwise timber 40 across each doorway of the car with its ends resting on the flanges of the adjacent end wheels of the side rows and fastening it to the frames of the doorway. Then, after the loading doorway is closed and sealed, the car is ready to travel.

It should be noted that all the spikes used function to hold the blocking in position and do not carry the load. The timbers are subjected to only compressive, shear and bending stresses. There are none under tensile stress.

Figures 4, 5, 6 and 7 illustrate a modification of the wheel piling arrangement that may be used with the method of blocking described above. In the modification as shown in Figures 4 and 5, the rear wheel 42 of each of the side rows at each end of the car is laid flat on the floor of the car with its flange upward and its rim tight against the cross timber 8. A square timber 44 is stood upright in the bore of wheel 42. The next wheel in the row is placed in leaning position with the inside surface of one portion of its rim resting on the top of the timber 44 and the inside surface of the diametrically opposite portion of its rim resting against the flange of wheel 42. The next succeeding wheels in each of the side rows lean one against the other. As the piling of each of the side rows progresses, each of the wheels approaches a vertical upright position, as shown by wheel 46. The balance of the blocking and loading is the same as shown in Figures 1 and 2 and described hereinbefore.

If desired, the upright timber 44 may be omitted, as shown in Figures 6 and 7, and the wheel adjacent the rear wheel positioned at an angle to the floor of the car with the upper part thereof extending over the rear wheel and its lower part resting on the floor of the car.

The embodiment shown in Figures 8 and 9 is characterized by the crosswise row of wheels adjacent each end of the car and the blocking of the crosswise rows. The remainder of the load and its blocking is exactly the same as that shown in Figures 1 and 2 and described hereinbefore. In loading according to this embodiment, a cross timber 48 is fastened to the floor of the car adjacent each end. A cross chock timber 50 is then fastened to the floor of the car adjacent each cross timber 48. The wheels first loaded are arranged in a crosswise row adjacent each end of the car. If desired, chock timbers 50 may be omitted and only one cross timber used at each end of the car if the cross timbers used are of sufficient width and height to prevent the wheels in the crosswise rows from contacting the end walls of the car. The wheels in each crosswise row are positioned vertically upright with their flanged edges facing the median line of the car so that the wheels will lean left and right against the side walls of the car. A square needle timber 52 is threaded into the bores of the wheels on each side of the median line to interlock them. A wedge block 54 is then fastened to the needle timber 52 approximately above the median line of the car between the facing wheels to hold timber 52 in position. Then, additional wheels may be loaded and blocked in the car in lengthwise rows in the same manner as shown in Figures 1a, 4 and 6 and described hereinbefore.

When it is desired to load a car to its maximum capacity, the open space 18 between the aligned rows of wheels is filled in with additional wheels as shown in Figure 10. The blocking in the center of the car is modified as shown and described hereinafter.

A square needle timber 56, which is long enough to span the doorway and overlap the frames, is threaded entirely through the bores of the end wheels of each side row toward one end of the car. The wheels in the aligned center rows are double blocked by the insertion of needle timber 24 and the affixing of cross timber 26 and lengthwise timber 28, as described hereinbefore. When all the wheels are loaded in the car, as shown in Figure 10, the timber 56 is worked far enough through the bores of the end wheels in the opposite row to span the doorway. A wedge block 58 is then fastened to the needle timber to prevent its creeping in either direction. The wedge block 58 also acts as a wedge between the hubs of the opposed wheels. A lengthwise timber 60 is fitted between the flanges on the lower part of the adjacent end wheels of the aligned side rows and then fastened to the floor of the car.

Although I have shown lengthwise timbers 60 blocking the lower portions of the adjacent end wheels of each side row, it will be noted that timbers 60 may be omitted, if desired, since wedge blocks 58 provide sufficient blocking between the adjacent end wheels of the side rows.

The loading and blocking is finally completed by positioning a lengthwise timber 62 across each doorway of the car resting on the flanges of the wheels in the aligned side rows and fastening it to the frames of the doorway. Then, after the loading doorway is closed and sealed, the car is ready to travel.

The choice of which of the above described embodiments of the invention to be used in loading is governed by the size of the order to be shipped, the size and weight of the wheels, and the volumetric and weight capacity of the car.

While several embodiments of my invention have been shown and described, it will be apparent that other adaptations and modifications may be made without departing from the scope of the following claims.

I claim:

1. The method of preparing a transportation load of center bored wheels or the like for transit in a railway car having a center doorway in at least one side thereof, which method comprises loading the wheels in said car in aligned rows extending to the ends of the car on each side of said doorway lengthwise of the car with a center space between the aligned rows, placing a plurality of the end wheels adjacent said center space of each of the aligned side rows in vertical upright position with their bores in alignment, placing the balance of the wheels in each side row between said plurality and the ends of the car in position abutting each other and abutting also said plurality of wheels to maintain the same in vertical upright position, threading a needle timber into the bores of a plurality of the end wheels adjacent said center space in each of the aligned rows, fastening a lengthwise timber to the floor of the car in said center space between each of the aligned side rows with the ends thereof abutting the opposed end wheels of the aligned side rows, locking said needle timber against endwise movement in said bores, placing the wheels in each of the aligned center rows in vertical upright position with their axes at right angles to the wheels in the side rows, threading a needle timber through the bores of the adjacent end wheels of each of the aligned center rows, and fastening a crosswise chock timber to the floor of the car in said center space abutting the opposed end wheels of the aligned center rows.

2. The method of preparing a transportation load of center bored wheels or the like for transit in a railway car having a center doorway in at least one side thereof, which method comprises loading the wheels in said car in three aligned rows extending to the ends of the car on each side of said doorway lengthwise of the car, the two side rows and one center row on one side of the doorway being aligned with the two side rows and one center row on the other side with an open space between the aligned rows, arranging a plurality of the wheels adjacent the open space in each of the side rows in vertical upright position with their axes lengthwise of the car, placing the balance of the wheels in each side row between said plurality and the ends of the car in position abutting each other and abutting also said plurality of wheels to maintain the same in vertical upright position, placing the wheels in each of the aligned center rows in pairs stood in vertical upright position with their axes at right angles to the wheels in the side rows, threading a needle timber through the bores of the adjacent end wheels of each of the aligned center rows, fastening a timber to the floor of the car lengthwise in said open space between the adjacent end wheels of the aligned side rows, threading a needle timber into the bores of a plurality of contiguous wheels adjacent the open space in each side row allowing an end portion of each needle timber to project outwardly from each side row into said open space, fitting a timber lengthwise between the faces of the adjacent end wheels of the aligned side rows, fastening said last named timbers to the projecting ends of said last named needle timbers, securing at least one cross timber across the last named lengthwise timbers, and fastening a lengthwise timber across the lower part of said doorway.

3. The method of preparing a transportation load of center bored wheels or the like for transit in a railway car having a center doorway in at least one side thereof, which method comprises loading the wheels in said car in three aligned parallel rows extending to the ends of the car on each side of said doorway lengthwise of the car, the two side rows and one center row on one side of the doorway being aligned with the two side rows and one center row on the other side with an open space between the aligned rows, arranging a plurality of the wheels adjacent the open space in each of the side rows in vertical upright position with their axes lengthwise of the car, placing the balance of the wheels in each side row between said plurality and the ends of the car in position abutting each other and abutting also said plurality of wheels to maintain the same in vertical upright position, placing the wheels in each of the aligned center rows in pairs stood in vertical upright position with their axes at right angles to the wheels in the side rows, threading a needle timber through the bores of the adjacent end wheels of each of the aligned center rows, threading a needle timber into the bores of a plurality of contiguous wheels adjacent the open space in each side row allowing an end portion of each needle timber to project outwardly from each side row into said open space, fitting a timber lengthwise between the faces of the adjacent end wheels of the aligned side rows, fastening said last named timbers to the projecting ends of said last named needle timbers, securing at least one cross timber across the last named lengthwise timbers, and fastening a lengthwise timber across the lower part of said doorway.

4. The method of preparing a transportation load of center bored wheels or the like for transit in a railway car having a center doorway in at least one side thereof, which method comprises fastening a cross timber to the floor of the car adjacent each end thereof, fastening a shorter cross timber to the floor of the car adjacent the mid-section of each of said cross timbers, loading the wheels in said car in three aligned rows on each side of said doorway lengthwise of the car, the two side rows and one center row on one side of the doorway being aligned with the two side rows and one center row on the other side with an open space between the aligned rows, arranging the wheels in each of the aligned side rows in vertical upright position with their axes lengthwise of the car, threading a needle timber into the bores of a plurality of contiguous wheels in the end of each side row adjacent the end wall of the car, the bottom edge of the rear wheel in each row being positioned against said first named cross timber, arranging the wheels in the aligned center rows in pairs stood in vertical position with their axes at right angles to the wheels in the side rows, the bottom edge of the rear wheels in each center row resting against said shorter cross timber, fastening a cross timber to the floor of the car subjacent the end wheels of each center row adjacent said open space, affixing a lengthwise timber to the floor of the car between said last named cross timbers, threading a needle timber into the bores of the end wheels of the aligned center rows adjacent said open space, threading a needle timber into the bores of a plurality of contiguous wheels adjacent the open space in each side row allowing an end portion of each needle timber to project outwardly from each side row into said space, fitting a timber lengthwise between the faces of the adjacent end wheels of the aligned side rows, attaching said last named timbers to the projecting ends of said needle timbers, securing at least one cross timber across the last named lengthwise timbers, fitting a lengthwise timber across the doorway of said car with its ends resting on the adjacent end wheels of the aligned side rows, fastening said last named lengthwise timber to the frame of said doorway, fastening a lengthwise cleat timber to the floor of the car adjacent each side of said doorway, said cleat timbers being positioned parallel to and spaced slightly from the side wall of the car, and fastening a lengthwise timber to said cleat timbers to span and block said doorway.

5. The method of preparing a transportation load of center bored and rimmed wheels or the like for transit in a railway car having a center doorway in at least one side thereof, which method comprises fastening a cross timber to the floor of the car adjacent each end thereof, loading the wheels in said car in three aligned rows on each side of said doorway lengthwise of the car, the two side rows and one center row on one side of the doorway being aligned with the two side rows and one center row on the other side with an open space between the aligned rows, positioning the rear wheel adjacent the cross timber in each side row horizontally flat on the floor of the car, positioning the wheel adjacent each of said rear wheels at an angle to the floor of the car with the upper part thereof extending over said horizontal wheel and its lower part resting on the floor of the car, supporting the last named wheel in said position, the remainder of the wheels in each side row being arranged progressively approaching vertical upright position with each subsequent wheel leaning against each preceding wheel, arranging a plurality of the wheels adjacent the open space in each of the side rows in vertical upright position with their axes lengthwise of the car, arranging the wheels in the aligned center rows in pair stood in vertical upright position with their axes at right angles to the wheels in the side rows, the bottom edge of the rear wheels in each center row resting against said shorter cross timber, fastening a cross timber to the floor of the car subjacent the end wheels of each center row adjacent said open space, affixing a lengthwise timber to the floor of the car between said last named cross timbers, threading a needle timber into the bores of the end wheels of the aligned center rows adjacent said open space, threading a needle timber into the bores of a plurality of contiguous wheels adjacent the open space in each side row allowing an end portion of each needle timber to project outwardly from each side row into said space, fitting a timber lengthwise between the faces of the adjacent end wheels of the aligned side rows, attaching said last named timber to the projecting ends of said needle timbers, securing at least one cross timber across the last named lengthwise timbers, fitting a lengthwise timber across the doorway of said car with its ends resting on the adjacent end wheels of the aligned side rows, fastening said last named lengthwise timber to the frame of said doorway, fastening a lengthwise cleat timber to the floor of the car adjacent each side of said doorway, said cleat timbers being positioned parallel to and spaced slightly from the side wall of the car, and fastening a lengthwise timber to said cleat timbers to span and block said doorway.

6. The method of preparing a transportation load of center bored and rimmed wheels or the like for transit in a railway car having a center doorway in at least one side thereof, which method comprises fastening a cross timber to the floor of the car adjacent each end thereof, loading the wheels in said car in three aligned rows no each side of said doorway lengthwise of the car, the two side rows and one center row on one side of the doorway being aligned with the two side rows and one center row on the other side with an open space between the aligned rows, positioning the rear wheel adjacent the cross timber in each side row horizontally flat on the floor of the car, inserting an upright timber into the bore of each of said rear wheels, positioning the wheel next adjacent each of said rear wheels at an angle from the floor of the car with the upper inside portion of its rim resting on the top of said upright timber and the bottom inside portion of its rim resting against the rim of said horizontally positioned rear wheel, the remainder of the wheels in each side row being arranged progressively approaching vertical upright position with each subsequent wheel leaning against each preceding wheel, placing a plurality of the wheels adjacent the open space in each of the side rows in vertical upright position with their axes lengthwise of the car, arranging the wheels in the aligned center rows in pairs stood in vertical upright position with their axes at right angles to the wheels in the side rows, the bottom edge of the rear wheels in each center row resting against said shorter cross timber, fastening a cross timber to the floor of the car subjacent the end wheels of each center row adjacent said open space, affixing a lengthwise timber to the floor of the car between said last named cross timbers, threading a needle timber into the bores of the end wheels of the aligned center rows adjacent said open space, threading a needle timber into the bores of a plurality of contiguous wheels adjacent the open space in each side row allowing an end portion of each needle timber to project outwardly from each side row into said space, fitting a timber lengthwise between the faces of the adjacent end wheels of the aligned side rows, attaching said last named timber to the projecting ends of said needle timbers, securing at least one cross timber across the last named lengthwise timbers, fitting a lengthwise timber across the doorway of said car with its ends resting on the adjacent end wheels of the aligned side rows, fastening said last named lengthwise timber to the frame of said doorway, fastening a lengthwise cleat timber to the floor of the car adjacent each side of said doorway, said cleat timbers being positioned parallel to and spaced slightly from the side wall of the car, and fastening a lengthwise timber to said cleat timbers to span and block said doorway.

7. The method of preparing a transportation load of center bored wheels or the like for transit in a railway car having a center doorway in at least one side thereof, which method comprises fastening a cross timber to the floor of the car adjacent each end thereof, loading a row of wheels crosswise at each end of the car, positioning the wheels in said crosswise rows vertically upright adjacent said cross timber, threading a needle timber into the bores of the wheels in each crosswise row, fastening a wedge block to said needle timber to hold the needle timber in position and prevent transverse movement of the wheels, loading additional wheels in said car in three aligned rows on each side of said doorway extending lengthwise of the car from said crosswise rows, the two side rows and one center row on one side of the doorway being aligned with the two side rows and one center row on the other side with an open space between the aligned rows, arranging the wheels in each aligned side row vertically upright with their axes lengthwise of the car, loading the wheels in the aligned center rows in pairs stood in vertical upright position with their axes at right angles to the wheels in the lengthwise side rows, fastening a cross timber to the floor of the car subjacent the end wheels of each center row adjacent said open space, affixing a lengthwise timber to the floor of the car between said last named cross timbers, threading a needle timber into the bores of the end wheels of the aligned center rows adjacent said open space, threading a needle timber into the bores of a plurality of contiguous wheels adjacent the open space in each lengthwise side row allowing an end portion of each needle timber to project outwardly from each side row into said space, fitting a timber lengthwise between the faces of the adjacent end wheels of the aligned side rows, attaching said last named timber to the projecting ends of said needle timbers, securing at least one cross timber across the last named lengthwise timbers, fitting a lengthwise timber across the doorway of said car with its ends resting on the adjacent end wheels of the aligned side rows, fastening said last named lengthwise timber to the frame of said doorway, fastening a lengthwise cleat timber to the floor of the car adjacent each side of said doorway, said cleat timbers being positioned parallel to and spaced slightly from the side wall of the car, and fastening a lengthwise timber to said cleat timbers to span and block said doorway.

8. The method of preparing a transportation load of center bored wheels or the like for transit in a railway car having a center doorway in at least one side thereof, which method comprises loading the wheels in said car in three aligned rows on each side of said doorway lengthwise of the car, the two side rows and one center row on one side of the doorway being aligned with the two side rows and one center row on the other side with an open space between the aligned rows, placing a plurality of the wheels in each of the side rows adjacent the open space in vertical upright position with their axes lengthwise of the car, placing the balance of the wheels in each side row between said plurality and the ends of the car in position abutting each other and abutting also said plurality of wheels to maintain the same in vertical upright position, arranging the wheels in each of the aligned center rows in pairs stood in vertical upright position with their axes at right angles to the wheels in the side rows, threading a needle timber through the bores of the adjacent end wheels of each of the aligned center rows, fastening a timber to the floor of the car lengthwise in said open space between the adjacent end wheels of the aligned side rows, threading a needle timber into the bores of a plurality of the end wheels in each pair of aligned side rows, fitting a wedge block between the faces of the adjacent end wheels of the aligned side rows, fastening said wedge block to said last named needle timber, and fastening a timber across the lower part of said doorway.

9. The method of preparing a transportation load of center bored wheels or the like for transit in a railway car having a center doorway in at least one side thereof, which method comprises loading the wheels in said car in three aligned rows on each side of said doorway lengthwise of the car, the two side rows and one center row on one side of the doorway being aligned with the two side rows and one center row on the other side with an open space between the aligned rows, placing a plurality of the wheels adjacent the open space in each of the side rows in vertical upright position with their axes lengthwise of the car, placing the balance of the wheels in each side row between said plurality and the ends of the car in position abutting each other and abutting also said plurality of wheels to maintain the same in vertical upright position, arranging the wheels in each of the aligned center rows in pairs stood in vertical upright position with their axes at right angles to the wheels in the side rows, threading a needle timber through the bores of the adjacent end wheels of each of the aligned center rows, threading a needle timber into the bores of a plurality of the end wheels in each pair of aligned side rows, fitting a wedge block between the faces of the adjacent end wheels of the aligned side rows, fastening said wedge block to said last named needle timber, and fastening a timber across the lower part of said doorway.

10. The method of preparing a transportation load of center bored wheels or the like for transit in a railway car having a center doorway in at least one side thereof, which method comprises fastening a cross timber to the floor of the car adjacent each end thereof, fastening a shorter cross timber to the floor of the car adjacent the mid-section of each of said cross timbers, loading the wheels in said car in three aligned rows on each side of said doorway lengthwise of the car, the two side rows and one center row on one side of the doorway being aligned with the two side rows and one center row on the other side with an open space between the aligned rows, placing the wheels in each of the aligned side rows in vertical upright position with their axes lengthwise of the car, threading a needle timber into the bores of a plurality of contiguous wheels in the end of each side row adjacent the end wall of the car, the bottom edge of the rear wheel in each side row being positioned adjacent said first named cross timber, arranging the wheels in the aligned center rows in pairs stood in vertical upright position with their axes at right angles to the wheels in the side rows, the bottom edge of the rear wheels in each center row resting against said shorter cross timber, fastening a cross timber to the floor of the car subjacent the end wheels of each center row adjacent said open space, affixing a lengthwise timber to the floor of the car between said last named cross timbers, threading a needle timber into the bores of the end wheels of the aligned center rows adjacent said open space, threading a needle timber into the bores of a plurality of the end wheels in each pair of aligned side rows adjacent the open space, fitting a wedge block between the faces of the adjacent end wheels of th aligned side rows, attaching said wedge block to said needle timber, fitting a lengthwise timber across the doorway of said car with its ends resting on the adjacent end wheels of the aligned side rows, fastening said last named lengthwise timber to the frame of said doorway, fastening a lengthwise cleat timber to the floor of the car adjacent each side of said doorway, said cleat timbers being positioned parallel to and spaced slightly from the side wall of the car, and fastening a lengthwise timber to said cleat timbers to span and block said doorway.

11. The method of preparing a transportation load of center bored and rimmed wheels or the like for transit in a railway car having a center doorway in at least one side thereof, which method comprises fastening a cross timber to the floor of the car adjacent each end thereof, loading the wheels in said car in three aligned rows on each side of said doorway lengthwise of the car, the two side rows and one center row on one side of the doorway being aligned with the two side rows and one center row on the other side with an open space between the aligned rows, positioning the rear wheel adjacent the cross timber in each side row horizontally flat on the floor of the car, positioning the wheel adjacent each of said rear wheels at an angle to the floor of the car with the upper part thereof extending over said horizontal wheel and its lower part resting on the floor of the car, supporting the last named wheel in said position, the remainder of the wheels in each side row being arranged progressively approaching vertical upright position with each subsequent wheel leaning against each preceding wheel, placing a plurality of the wheels adjacent the open space in each of the side rows in vertical upright position with their axes lengthwise of the car, arranging the wheels in the aligned center rows in pairs stood in vertical upright position with their axes at right angles to the wheels in the side rows, the bottom edge of the rear wheels in each center row resting against said shorter cross timber, fastening a cross timber to the floor of the car subjacent the end wheels of each center row adjacent said open space, affixing a lengthwise timber to the floor of the car between said last named cross timbers, threading a needle timber into the bores of the end wheels of the aligned center rows adjacent said open space, threading a needle timber into the bores of a plurality of the end wheels in each pair of aligned side rows adjacent the open space, fitting a wedge block between the faces of the adjacent end wheels of the aligned side rows, attaching said wedge block to said needle timber, fitting a lengthwise timber across the doorway of said car with its ends resting on the adjacent end wheels of the aligned side rows, fastening said last named lengthwise timber to the frame of said doorway, fastening a lengthwise cleat timber to the floor of the car adjacent each side of said doorway, said cleat timbers being positioned parallel to and spaced slightly from the side wall of the car, and fastening a lengthwise timber to said cleat timbers to span and block said doorway.

12. The method of preparing a transportation load of center bored and rimmed wheels or the like for transit in a railway car having a center doorway in at least one side thereof, which method comprises fastening a cross timber to the floor of the car adjacent each end thereof, loading the wheels in said car in three aligned rows on each side of said doorway lengthwise of the car, the two side rows and one center row on one side of the doorway being aligned with the two side rows and one center row on the other side with an open space between the aligned rows, positioning the rear wheel adjacent the cross timber in each side row horizontally flat on the floor of the car, inserting an upright timber into the bore of each of said rear wheels, positioning the wheel next adjacent each of said rear wheels at an angle from the floor of the car with the upper inside portion of its rim resting on the top of said upright timber and the bottom inside portion of its rim resting against the rim of said horizontally positioned rear wheel, the remainder of the wheels in each side row being arranged progressively approaching vertical upright position with each subsequent wheel leaning against each preceding wheel, placing a plurality of the wheels adjacent the open space in each of the side rows in vertical upright position with their axes arranged lengthwise of the car, arranging the wheels in the aligned center rows in pairs stood in vertical upright position with their axes at right angles to the wheels in the side rows, the bottom edge of the rear wheels in each center row resting against said shorter cross timber, fastening a cross timber to the floor of the car subjacent the end wheels of each center row adjacent said open space, affixing a lengthwise timber to the floor of the car between said last named cross timbers, threading a needle timber into the bores of the end wheels of the aligned center rows adjacent said open space, threading a needle timber into the bores of a plurality of the end wheels in each pair of aligned side rows adjacent the open space, fitting a wedge block between the faces of the adjacent end wheels of the aligned side rows, attaching said wedge block to said needle timber, fitting a lengthwise timber across the doorway of said car with its ends resting on the adjacent end wheels of the aligned side rows, fastening said last named lengthwise timber to the frame of said doorway, fastening a lengthwise cleat timber to the floor of the car adjacent each side of said doorway, said cleat timbers being positioned parallel to and spaced slightly from the side wall of the car, and fastening a lengthwise timber to said cleat timbers to span and block said doorway.

13. The method of preparing a transportation load of center bored wheels or the like for transit in a railway car having a center doorway in at least one side thereof, which method comprises fastening a cross timber to the floor of the car adjacent each end thereof, loading a row of wheels crosswise at each end of the car, positioning the wheels in said crosswise rows vertically upright adjacent said cross timber, threading a needle timber into the bores of the wheels in each crosswise row, fastening a wedge block to said needle timber to hold the needle timber in position and prevent transverse movement of the wheels, loading additional wheels in said car in three aligned rows on each side of said doorway extending lengthwise of the car from said crosswise rows, the two side rows and one center row on one side of the doorway being aligned with the two side rows and one center row on the other side with an open space between the aligned rows, positioning the wheels in each aligned side row vertically upright with their axes lengthwise of the car, arranging the wheels in the aligned center rows in pairs stood in vertical upright position with their axes at right angles to the wheels in the lengthwise side rows, fastening a cross timber to the floor of the car subjacent the end wheels of each center row adjacent said open space, affixing a lengthwise timber to the floor of the car between said last named cross timbers, threading a needle timber into the bores of the end wheels of the aligned center rows adjacent said open space, threading a needle timber into the bores of a plurality of the end wheels in each pair of aligned side rows adjacent the open space, fitting a wedge block between the faces of the adjacent end wheels of the aligned side rows, attaching said wedge block to said needle timber, fitting a lengthwise timber across the doorway of said car with its ends resting on the adjacent end wheels of the aligned side rows, fastening said last named lengthwise timber to the frame of said doorway, fastening a lengthwise cleat timber to the floor of the car adjacent each side of said doorway, said cleat timbers being positioned parallel to and spaced slightly from the side wall of the car, and fastening a lengthwise timber to said cleat timber to span and block said doorway.

14. A transportation load of center bored wheels or the like for a railway car having a center doorway in at least one side thereof, which load comprises a plurality of wheels arranged in said car in aligned rows extending to the ends of the car on each side of said doorway lengthwise of the car with a center space between the aligned rows, a plurality of the end wheels adjacent said center space of each of the aligned side rows being placed in vertical upright position with their bores in alignment, the balance of the wheels in each side row between said plurality and the ends of the car abutting each other and abutting also said plurality of wheels to maintain the same in vertical upright position, a needle timber threaded into the bores of a plurality of the wheels adjacent said center space in each of the aligned rows, a lengthwise timber fastened to the floor of the car in said center space between each of the aligned side rows with the ends thereof abutting the opposed end wheels of the aligned side rows, said needle timber being locked against endwise movement in said bores, the wheels in each of the aligned center rows being arranged in pairs stood in vertical upright position with their bores at right angles to the wheels at the side rows, a needle timber threaded through the bores of the adjacent end wheels of each of the aligned center rows, and a crosswise chock timber fastened to the floor of the car in said center space abutting the opposed end wheels of the aligned center rows.

15. A transportation load of center bored wheels or the like for a railway car having a center doorway in at least one side thereof, which load comprises a plurality of wheels arranged in said car in three aligned rows extending to the ends of the car on each side of said doorway lengthwise of the car, the two side rows and one center row on one side of the doorway being aligned with the two side rows and one center row on the other side with an open space between the aligned rows, a plurality of the wheels in each of the side rows adjacent the open space being placed in vertical upright position with their axes arranged lengthwise of the car, the balance of the wheels in each side row between said plurality and the ends of the car abutting each other and abutting also said plurality of wheels to maintain the same in vertical upright position, the wheels in each of the aligned center rows being arranged in pairs stood in vertical upright position with their axes at right angles to the wheels in the side rows, a needle timber threaded through the bores of the adjacent end wheels of each of the aligned center rows, a timber fastened to the floor of the car lengthwise in said open space between the adjacent end wheels of the aligned side rows, a needle timber threaded into the bores of a plurality of contiguous wheels adjacent the open space in each side row, an end portion of each of said needle timbers projecting outwardly from each side row into said open space, a lengthwise timber fitted between the faces of the adjacent end wheels of the aligned side rows and fastened to the projecting ends of said last named needle timbers, one or more cross timbers fastened across the last named lengthwise timbers, and a lengthwise timber fastened across the lower part of said doorway.

16. A transportation load of center bored wheels or the like for a railway car having a center doorway in at least one side thereof, which load comprises a plurality of wheels arranged in said car in three aligned rows extending to the ends of the car on each side of said doorway lengthwise of the car, the two side rows and one center row on one side of the doorway being aligned with the two side rows and one center row on the other side with an open space between the aligned rows, a plurality of the wheels in each of the side rows adjacent the open space being placed in vertical upright position with their axes arranged lengthwise of the car, the balance of the wheels in each side row between said plurality and the ends of the car abutting each other and abutting also said plurality of wheels to maintain the same in vertical upright position, the wheels in each of the aligned center rows being arranged in pairs stood in vertical upright position with their axes at right angles to the wheels in the side rows, a needle timber threaded through the bores of the adjacent end wheels of each of the aligned center rows, a needle timber threaded into the bores of a plurality of contiguous wheels adjacent the open space in each side row, an end portion of each of said needle timbers projecting outwardly from each side row into said open space, a lengthwise timber fitted between the faces of the adjacent end wheels of the aligned side rows and fastened to the projecting ends of said last named needle timbers, one or more cross timbers fastened across the last named lengthwise timbers, and a lengthwise timber fastened across the lower part of said doorway.

17. A transportation load of center bored wheels or the like for a railway car having a center doorway in at least one side thereof, which load comprises a cross timber fastened to the floor of the car adjacent each end thereof, a shorter cross timber fastened to the floor of the car adjacent the mid-section of each of said cross timbers, a plurality of wheels arranged in said car in three aligned rows on each side of said doorway lengthwise of the car, the two side rows and one center row on one side of the doorway being aligned with the two side rows and one center row on the other side with an open space between the aligned rows, the wheels in each side row being arranged in vertical upright position with their axes lengthwise of the car, a needle timber threaded into the bores of a plurality of contiguous wheels in the end of each side row adjacent the end wall of the car, the bottom edge of the rear wheel in each row being positioned adjacent said cross timber, the wheels in the aligned center rows being arranged in pairs stood in vertical upright position with their axes at right angles to the wheels in the side rows, the bottom edge of the rear wheels in each aligned center row resting against said shorter cross timber, a cross timber fastened to the floor of the car subjacent the end wheels of each center row adjacent said open space, a lengthwise timber fastened to the floor of the car between said last named cross timbers, a needle timber threaded into the bores of the end wheels of the aligned center rows adjacent said open space, a needle timber threaded into the bores of a plurality of contiguous wheels adjacent the open space in each side row, an end portion of each needle timber projecting outwardly from each row into said space, a timber fitted lengthwise in each row between the faces of the adjacent end wheels of the aligned side rows, said last named timber being fastened to the projecting ends of said needle timbers, at least one cross timber fastened across the last named lengthwise timbers, a lengthwise timber fastened across said doorway with its ends resting on the adjacent end wheels of the aligned side rows, a lengthwise cleat timber fastened to the floor of the car adjacent each side of said doorway, said cleat timbers being positioned parallel to and spaced slightly from the side wall of the car, and a lengthwise timber fastened to said cleat timbers to span and block said doorway.

18. A transportation load of center bored wheels or the like for a railway car having a center doorway in at least one side thereof, which load comprises a cross timber fastened to the floor of the car adjacent each end thereof, a plurality of wheels arranged in said car in three aligned rows on each side of said doorway lengthwise of the car, the two side rows and one center row on one side of the doorway being aligned with the two side rows and one center row on the other side with an open space between the aligned rows, the rear wheel adjacent the cross timber in each row being positioned horizontally flat on the floor of the car, the wheel next adjacent each of said rear wheels being positioned at an angle to the floor of the car with the upper part thereof extending over said horizontal wheel and its lower part resting on the floor of the car, the remainder of the wheels in each side row being arranged progressively approaching vertical upright position with each subsequent wheel leaning against each preceding wheel, a plurality of the wheels adjacent the open space in each of the side rows being in vertical upright position with their axes arranged lengthwise of the car, the wheels in the aligned center rows being arranged in pairs stood in vertical upright position with their axes at right angles to the wheels in the side rows, the bottom edge of the rear wheels in each center row resting against said shorter cross timber, a cross timber fastened to the floor of the car subjacent the end wheels of each center row adjacent said open space, a lengthwise timber affixed to the floor of the car between said last named cross timbers, a needle timber threaded into the bores of the end wheels of the aligned center rows adjacent said open space, a needle timber threaded into the bores of a plurality of contiguous wheels adjacent the open space in each side row, an end portion of each needle timber projecting outwardly from each row into said space, a timber fitted lengthwise in each row between the faces of the wheels adjacent said space, said last named timbers being fastened to the projecting ends of said needle timbers, at least one cross timber fastened across the last named lengthwise timbers, a lengthwise timber fastened across said doorway with its ends resting on the adjacent end wheels of the aligned side rows, a lengthwise cleat timber fastened to the floor of the car adjacent each side of said doorway, said cleat timbers being positioned parallel to and spaced slightly from the side wall of the car, and a lengthwise timber fastened to said cleat timbers to span and block said doorway.

19. A transportation load of center bored and rimmed wheels or the like for a railway car having a center doorway in at least one side thereof, which load comprises a cross timber fastened to the floor of the car adjacent each end thereof, a plurality of wheels arranged in said car in three aligned rows on each side of said doorway lengthwise of the car, the two side rows and one center row on one side of the doorway being aligned with the two side rows and one center row on the other side with an open space between the aligned rows, the rear wheel adjacent the cross timber in each row being positioned horizontally flat on the floor of the car, an upright timber inserted into the bore of each of said rear wheels and projecting upwardly therefrom, the wheel next adjacent each of said rear wheels being positioned at an angle from the floor of the car with the upper inside portion of its rim resting on the top of said upright timber and the bottom inside portion of its rim resting against the rim of said horizontally positioned rear wheel, the remainder of the wheels in each side row being arranged progressively approaching vertical upright position with each subsequent wheel leaning against each preceding wheel, a plurality of the wheels adjacent the open space in each of the side rows being in vertical upright position with their axes arranged lengthwise of the car, the wheels in the aligned center rows being arranged in pairs stood in vertical upright position with their axes at right angles to the wheels in the side rows, the bottom edge of the rear wheels in each center row resting against said shorter cross timber, a cross timber fastened to the floor of the car subjacent the end wheels of each center row adjacent said open space, a lengthwise timber affixed to the floor of the car between said last named cross timbers, a needle timber threaded into the bores of the end wheels of the aligned center rows adjacent said open space, a needle timber threaded into the bores of a plurality of contiguous wheels adjacent the open space in each side row, an end portion of each needle timber projecting outwardly from each row into said space, a timber fitted lengthwise in each row between the faces of the wheels adjacent said space, said last named timbers being fastened to the projecting ends of said needle timbers, at least one cross timber fastened across the last named lengthwise timbers, a lengthwise timber fastened across said doorway with its ends resting on the adjacent end wheels of the aligned side rows, a lengthwise cleat timber fastened to the floor of the car adjacent each side of said doorway, said cleat timbers being positioned parallel to and spaced slightly from the side wall of the car, and a lengthwise timber fastened to said cleat timbers to span and block said doorway.

20. A transportation load of center bored wheels or the like for a railway car having a center doorway in at least one side thereof, which load comprises a cross timber fastened to the floor of the car adjacent each end thereof, a plurality of wheels arranged in a crosswise row at each end of the car, the wheels in said crosswise rows being positioned vertically upright adjacent said cross timber, a needle timber threaded into the bores of the wheels in each crosswise row, a wedge block fastened to said needle timber to hold the needle timber in position and prevent transverse movement of the wheels, additional wheels in said car being arranged in three aligned rows on each side of said doorway extending lengthwise of the car from said crosswise rows, the two side rows and one center row on one side of the doorway being aligned with the two side rows and one center row on the other side with an open space between the aligned rows, the wheels in each aligned side row being positioned vertically upright with their axes arranged lengthwise of the car, the wheels in the aligned center rows being arranged in pairs stood in vertical upright position with their axes at right angles to the wheels in the side rows, a cross timber fastened to the floor of the car subjacent the end wheels of each center row adjacent said open space, a lengthwise timber fastened to the floor of the car between said last named cross timbers, a needle timber threaded into the bores of the end wheels of the aligned center rows adjacent said open space, a needle timber threaded into the bores of a plurality of contiguous wheels adjacent the open space in each side row, an end portion of each needle timber projecting outwardly from each row into said space, a timber fitted lengthwise in each row between the faces of the adjacent end wheels of the aligned side rows, said last named timber being fastened to the projecting ends of said needle timbers, one or more cross timbers fastened across the last named lengthwise timbers, a lengthwise timber fastened across said doorway with its ends resting on the adjacent end wheels of the aligned side rows, a lengthwise cleat timber fastened to the floor of the car adjacent each side of said doorway, said cleat timbers being positioned parallel to and spaced slightly from the side wall of the car, and a lengthwise timber fastened to said cleat timbers to span and block said doorway.

21. A transportation load of center bored wheels or the like for a railway car having a center doorway in at least one side thereof, which load comprises a plurality of wheels arranged in said car in three aligned rows extending to the ends of the car on each side of said doorway lengthwise of the car, the two side rows and one center row on one side of the doorway being aligned with the two side rows and one center row on the other side with an open space between the aligned rows, a plurality of the wheels in each of the side rows adjacent the open space being placed in vertical upright position with their axes arranged lengthwise of the car, the balance of the wheels in each side row between said plurality and the ends of the car abutting each other and abutting also said plurality of wheels to maintain the same in vertical upright position, the wheels in each of the aligned center rows being arranged in pairs stood in vertical upright position with their axes at right angles to the wheels in the side rows, a needle timber threaded through the bores of the adjacent end wheels of each of the aligned center rows, a timber fastened to the floor of the car lengthwise in said open space between the adjacent end wheels of the aligned side rows, a needle timber threaded into the bores of a plurality of the end wheels in each pair of aligned side rows, a wedge block fitted between the faces of the adjacent end wheels of the aligned side rows and fastened to said last named needle timber, and a timber fastened across the lower part of said doorway.

22. A transportation load of center bored wheels or the like for a railway car having a center doorway in at least one side thereof, which load comprises a plurality of wheels arranged in said car in three aligned rows extending to the ends of the car on each side of said doorway lengthwise of the car, the two side rows and one center row on one side of the doorway being aligned with the two side rows and one center row on the other side with an open space between the aligned rows, a plurality of the wheels in each of the side rows adjacent the open space being placed in vertical upright position with their axes arranged lengthwise of the car, the balance of the wheels in each side row between said plurality and the ends of the car abutting each other and abutting also said plurality of wheels to maintain the same in vertical upright position, the wheels in each of the aligned center rows being arranged in pairs stood in vertical upright position with their axes at right angles to the wheels in the side rows, a needle timber threaded through the bores of the adjacent end wheels of each of the aligned center rows, a needle timber threaded into the bores of a plurality of the end wheels in each pair of aligned side rows, a wedge block fitted between the faces of the adjacent end wheels of the aligned side rows and fastened to said last named needle timber, and a timber fastened across the lower part of said doorway.

23. A transportation load of center bored wheels or the like for a railway car having a center doorway in at least one side thereof, which load comprises a cross timber fastened to the floor of the car adjacent each end thereof, a shorter cross timber fastened to the floor of the car adjacent the mid-section of each of said cross timbers, a plurality of wheels arranged in said car in three aligned rows on each side of said doorway lengthwise of the car, the two side rows and one center row on one side of the doorway being aligned with the two side rows and one center row on the other side with an open space between the aligned rows, the wheels in each of the two side rows being arranged in vertical upright position with their axes lengthwise of the car, a needle timber threaded into the bores of a plurality of contiguous wheels in the end of each side row adjacent the end wall of the car, the bottom edge of the rear wheel in each row being positioned adjacent said cross timber, the wheels in the aligned center rows being arranged in pairs stood in vertical upright position with their axes at right angles to the wheels in the side rows, the bottom edge of the rear wheels in each aligned center row resting against said shorter cross timber, a cross timber fastened to the floor of the car subjacent the end wheels of each center row adjacent said open space, a lengthwise timber fastened to the floor of the car between said last named cross timbers, a needle timber threaded into the bores of the end wheels of the aligned center rows adjacent said open space, a timber fastened to the floor of the car lengthwise between the adjacent end wheels of the aligned side rows, a needle timber threaded into the bores of a plurality of the end wheels adjacent the open space in each pair of aligned side rows, a wedge block attached to each of said last named needle timbers to prevent endwise movement thereof, a lengthwise timber fastened across said doorway with its ends resting on the adjacent end wheels of the aligned side rows, a lengthwise cleat timber fastened to the floor of the car adjacent each side of said doorway, said cleat timbers being positioned parallel to and spaced slightly from the side wall of the car, and a lengthwise timber fastened to said cleat timbers to span and block said doorway.

24. A transportation load of center bored wheels or the like for a railway car having a center doorway in at least one side thereof, which load comprises a cross timber fastened to the floor of the car adjacent each end thereof, a plurality of wheels arranged in said car in three aligned rows on each side of said doorway lengthwise of the car, the two side rows and one center row on one side of the doorway being aligned with the two side rows and one center row on the other side with an open space between the aligned rows, the rear wheel adjacent the cross timber in each row being positioned horizontally flat on the floor of the car, the wheel next adjacent each of said rear wheels being positioned at an angle to the floor of the car with the upper part thereof extending over said horizontal wheel and its lower part resting on the floor of the car, the remainder of the wheels in each side row being arranged progressively approaching vertical upright position with each subsequent wheel leaning against each preceding wheel, a plurality of the wheels adjacent the open space in each of the side rows being arranged in vertical upright position with their axes lengthwise of the car, the wheels in the aligned center rows being arranged in pairs stood in vertical upright position with their axes at right angles to the wheels in the side rows, the bottom edge of the rear wheels in each center row resting against said shorter cross timber, a cross timber fastened to the floor of the car subjacent the end wheels of each center row adjacent said open space, a lengthwise timber affixed to the floor of the car between said last named cross timbers, a needle timber threaded into the bores of the end wheels of the aligned center rows adjacent said open space, a needle timber threaded into the bores of a plurality of the end wheels adjacent the open space in each pair of aligned side rows, a wedge block attached to each of said last named needle timbers to prevent endwise movement thereof, a lengthwise timber fastened across said doorway with its ends resting on the adjacent end wheels of the aligned side rows, a lengthwise cleat timber fastened to the floor of the car adjacent each side of said doorway, said cleat timbers being positioned parallel to and spaced slightly from the side wall of the car, and a lengthwise timber fastened to said cleat timbers to span and block said doorway.

25. A transportation load of center bored and rimmed wheels or the like for a railway car having a center doorway in at least one side thereof, which load comprises a cross timber fastened to the floor of the car adjacent each end thereof, a plurality of car wheels arranged in said car in three aligned rows on each side of said doorway lengthwise of the car, the two side rows and one center row on one side of the doorway being aligned with the two side rows and one center row on the other side with an open space between the aligned rows, the rear wheel adjacent the cross timber in each row being positioned horizontally flat on the floor of the car, an upright timber inserted into the bore of each of said rear wheels and projecting upwardly therefrom, the wheel next adjacent each of said rear wheels being positioned at an angle from the floor of the car with the upper inside portion of its rim resting on the top of said upright timber and the bottom inside portion of its rim resting against the rim of said horizontally positioned rear wheel, the remainder of the wheels in each side row being arranged progressively approaching vertical upright position with each subsequent wheel leaning against each preceding wheel, a plurality of the wheels adjacent the open space in each of the side rows being arranged in vertical upright position with their axes lengthwise of the car, the wheels in the aligned center rows being arranged in pairs stood in vertical upright position with their axes at right angles to the wheels in the side rows, the bottom edge of the rear wheels in each center row resting against said shorter cross timber, a cross timber fastened to the floor of the car subjacent the end wheels of each center row adjacent said open space, a lengthwise timber affixed to the floor of the car between said last named cross timbers, a needle timber threaded into the bores of the end wheels of the aligned center rows adjacent said open space, a needle timber threaded into the bores of a plurality of the end wheels adjacent the open space in each pair of aligned side rows, a wedge block attached to each of said last named needle timbers to prevent endwise movement thereof, a lengthwise timber fastened across said doorway with its ends resting on the adjacent end wheels of the aligned side rows, a lengthwise cleat timber fastened to the floor of the car adjacent each side of said doorway, said cleat timbers being positioned parallel to and spaced slightly from the side wall of the car, and a lengthwise timber fastened to said cleat timbers to span and block said doorway.

26. A transportation load of center bored wheels or the like for a railway car having a center doorway in at least one side thereof, which load comprises a cross timber fastened to the floor of the car adjacent each end thereof, a plurality of wheels arranged in a crosswise row at each end of the car, the wheels in said crosswise rows being positioned vertically upright adjacent said cross timber, a needle timber threaded into the bores of the wheels in each crosswise row, a wedge block fastened to said needle timber to hold the needle timber in position and prevent transverse movement of the wheels, additional wheels in said car being arranged in three aligned rows on each side of said doorway extending lengthwise of the car from said crosswise rows, the two side rows and one center row on one side of the doorway being aligned with the two side rows and one center row on the other side with an open space between the aligned rows, the wheels in each aligned side row being positioned vertically upright with their axes arranged lengthwise of the car, the wheels in the aligned center rows being arranged in pairs stood in vertical upright position with their axes at right angles to the wheels in the side rows, a cross timber fastened to the floor of the car subjacent the end wheels of each center row adjacent said open space, a lengthwise timber fastened to the floor of the car between said last named cross timbers, a needle timber threaded into the bores of the end wheels of the aligned center rows adjacent said open space, a needle timber threaded into the bores of a plurality of the end wheels adjacent the open space in each pair of aligned side rows, a wedge block attached to said last named needle timber to prevent the endwise movement thereof, a lengthwise timber fastened across said doorway with its ends resting on the adjacent end wheels of the aligned side rows, a lengthwise cleat timber fastened to the floor of the car adjacent each side of said doorway, said cleat timbers being positioned parallel to and spaced slightly from the side wall of the car, and a lengthwise timber fastened to said cleat timbers to span and block said doorway.

DEWEY M. SEELEY.

No references cited.